UNITED STATES PATENT OFFICE.

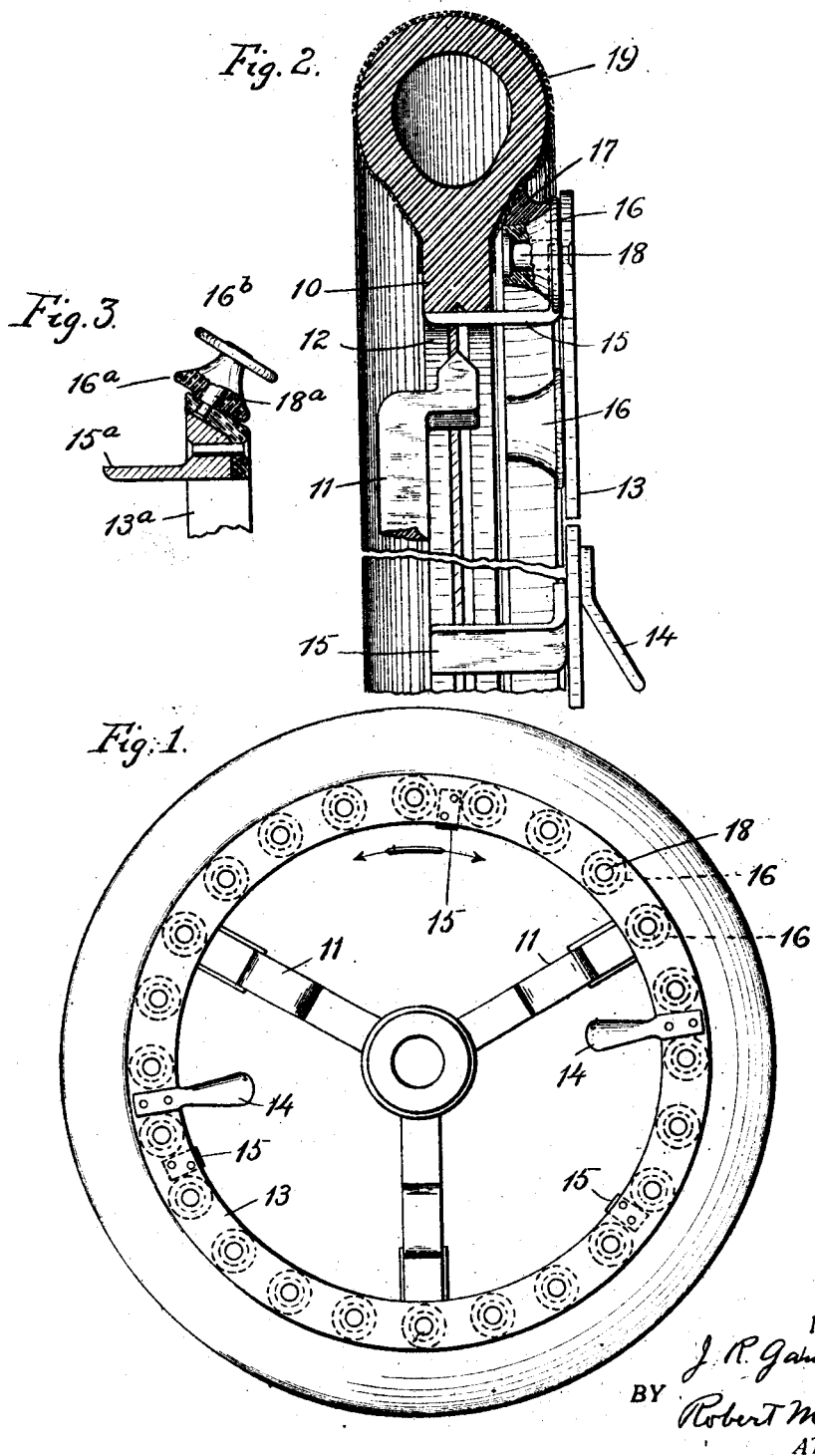

JOHN R. GAMMETER, OF AKRON, OHIO, ASSIGNOR TO THE B. F. GOODRICH COMPANY, OF NEW YORK, N. Y., A CORPORATION OF NEW YORK.

BEAD-ROLLING DEVICE FOR PNEUMATIC TIRES.

1,192,181. Specification of Letters Patent. Patented July 25, 1916.

Application filed July 2, 1915. Serial No. 37,709.

*To all whom it may concern:*

Be it known that I, JOHN R. GAMMETER, a citizen of the United States, residing at Akron, in the county of Summit and State of Ohio, have invented certain new and useful Improvements in Bead-Rolling Devices for Pneumatic Tires, of which the following is a specification.

This invention relates to means for applying bead fillers to the partly-formed carcasses of pneumatic tires, and it has for its object to provide an apparatus whereby the filler or bead may be accurately centered with respect to the tire-forming core and caused to adhere to the rubberized tire fabric by a rolling action.

Of the accompanying drawings: Figure 1 represents a side elevation of a tire-forming apparatus with a preferred embodiment of my bead-rolling device applied thereto. Fig. 2 represents a sectional view, partly broken away, of the core and the partly-formed tire thereon, together with the bead and also the rolling device shown in elevation, with one of its rollers partly in section. Fig. 3 represents a sectional view showing a modification.

In the drawings 10 is a tire-forming core of the usual type supported by the arms 11 of an adjustable chuck and having the usual concentric cylindrical surface 12 on the inner margin of the tongue of said core.

13 is an annular frame or ring provided with a pair of oppositely-located handles 14 for transporting it to and from the core and manipulating it with respect thereto, said frame having three equi-distant centering and guiding lugs 15 parallel with its axis and adapted to fit within the cylindrical core surface 12, and an annular series of rollers 16 having tapering concave sides to conform to the under side of the annular bead or bead filler 17 and freely journaled upon studs 18 which project inwardly parallel to the axis of the core and frame, the large ends of the rollers being adjacent to the frame.

A number of layers 19 of the usual frictioned fabric or any suitable tire-forming material are shown in place on the core, the beads being applied to these inner layers and the carcass being then completed by the addition of one or more outer layers, and the bead wrapped in place between the margins of the inner and outer layers, and the beaded edges trimmed and rolled in the usual way.

An apparatus of the type illustrated is especially useful in connection with extensible-edged clencher tires whose bead-fillers are too soft to retain their circular form without support. In operating my device, a bead or filler 17, whose ends have been brought together and spliced to make an annulus, is laid upon the rollers 16, the frame 13 is grasped by means of the handles 14 and brought to the core, the guide lugs 15 are slipped into engagement with the cylindrical core surface 12, whereby the roller frame is centered, and inward pressure is applied, causing the tacky surface of the bead to adhere to that of the outer frictioned fabric layer of the carcass, while the frame is rotated back and forth one or more times through a short arc and the rollers 16 thereby caused to roll the bead into place and insure that all parts thereof are circular and concentric with the core, the guide lugs 15 sliding circularly on the inner cylindrical core surface 12 during the rotary manipulation of the roller frame.

I believe myself to be the first to provide means for applying a rolling pressure to the bead simultaneously at a number of points around its circumference; or to provide any practical means for centering and rolling the bead while the core is held stationary, without the use of hand tools separate from the centering device.

Various modifications can be made in the form and arrangement of parts. The supporting frame 13 may be of any suitable shape, although most conveniently made in the shape of a ring as shown.

Fig. 3 shows a modified annular frame 13$^a$, guide lugs 15$^a$, and roller 16$^a$, the roller studs 18$^a$ in this case slanting outwardly from the supporting frame and each roller including a flange 16$^b$ adapted to bear against the upper side of the bead, in addition to the concave roller surface conforming to its under side.

I claim:

1. A bead-rolling device for pneumatic tires comprising a rotatable frame having means for guiding and centering it on the tire-forming core, and an annular series of bead-applying rollers mounted on said frame.

2. A bead-rolling device for pneumatic tires comprising a portable frame having a pair of handles at opposite points, and an annular series of bead rollers on said frame.

3. A bead-rolling device for pneumatic tires comprising an annular frame having means for centering and guiding it on the tire-forming core, and an annular series of freely-journaled bead rollers mounted on said frame with their axes parallel with the axis of the frame.

4. A bead-rolling device for pneumatic tires comprising a supporting ring having a series of lugs parallel to its axis for guiding and centering it on the tire core, a pair of handles at opposite points on said ring, an annular series of studs projecting laterally from said ring on the same side as the lugs, and a series of concave tapered rollers mounted to turn freely on said studs and having their larger ends adjacent to the ring.

5. The combination with a tire-forming core, of a series of bead-rollers distributed about its circumference for centering the bead and rolling it in place on the tire carcass, said rollers being circumferentially shiftable relative to the core.

In testimony whereof I have hereunto set my hand this 30 day of June 1915.

JOHN R. GAMMETER.

Copies of this patent may be obtained for five cents each, by addressing the "Commissioner of Patents, Washington, D. C."